United States Patent
Lim et al.

(10) Patent No.: US 8,861,432 B2
(45) Date of Patent: Oct. 14, 2014

(54) METHOD AND APPARATUS FOR SUPPORTING MULTIPLE MAC VERSIONS IN BROADBAND WIRELESS COMMUNICATION SYSTEM

(75) Inventors: Ae-Ri Lim, Suwon-si (KR); Young-Hak Kim, Suwon-si (KR); Jae-Jeong Shim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 934 days.

(21) Appl. No.: 12/584,732

(22) Filed: Sep. 11, 2009

(65) Prior Publication Data

US 2010/0061307 A1    Mar. 11, 2010

(30) Foreign Application Priority Data

Sep. 11, 2008   (KR) ................ 10-2008-0089696

(51) Int. Cl.
- *H04W 4/00* (2009.01)
- *H04J 3/24* (2006.01)
- *H04W 48/16* (2009.01)
- *H04W 48/18* (2009.01)

(52) U.S. Cl.
CPC .............. *H04W 48/16* (2013.01); *H04W 48/18* (2013.01)
USPC ............................ 370/328; 370/329; 370/349

(58) Field of Classification Search
None
See application file for complete search history.

(56) References Cited

U.S. PATENT DOCUMENTS

| | | | |
|---|---|---|---|
| 6,600,917 B1 * | 7/2003 | Maupin | 455/414.1 |
| 2004/0002357 A1 | 1/2004 | Benveniste | |
| 2004/0114535 A1 | 6/2004 | Hoffman et al. | |
| 2005/0030922 A1 | 2/2005 | Lee et al. | |
| 2005/0250499 A1 * | 11/2005 | Lee et al. | 455/437 |
| 2006/0079220 A1 | 4/2006 | Cha et al. | |
| 2008/0186910 A1 | 8/2008 | Cho et al. | |
| 2010/0008328 A1 * | 1/2010 | Maheshwari et al. | 370/331 |
| 2010/0177831 A1 * | 7/2010 | Kim et al. | 375/259 |

FOREIGN PATENT DOCUMENTS

KR   10-2008-0072115   8/2008

OTHER PUBLICATIONS

International Search Report and Written Opinion of International Searching Authority dated Apr. 30, 2010 in connection with International Application No. PCT/KR2009/005175.

Notice of Patent Grant dated Jun. 29, 2014 in connection with Korean Patent Application No. 10-2008-0089696, 2 pages.

* cited by examiner

*Primary Examiner* — Derrick Ferris
*Assistant Examiner* — Kodzovi Acolatse

(57)   ABSTRACT

A method and an apparatus are configured to support a plurality of Media Access Control (MAC) versions in a broadband wireless communication system. An operating method of a terminal to support the multiple MAC versions in the broadband wireless communication system includes receiving a message comprising information of one or more MAC versions supported by a base station, from the base station; and sending information of one or more MAC versions supported by the terminal, to the base station using a message. Thus, in the wireless environment where the multiple MAC versions are mixed, the MAC version can be matched.

21 Claims, 14 Drawing Sheets

METHOD AND APPARATUS FOR SUPPORTING MULTIPLE MAC VERSIONS IN BROADBAND WIRELESS COMMUNICATION SYSTEM

CROSS-REFERENCE TO RELATED APPLICATION(S) AND CLAIM OF PRIORITY

The present application is related to and claims the benefit under 35 U.S.C. §119 to an application filed in the Korean Intellectual Property Office on Sep. 11, 2008 and assigned Serial No. 10-2008-0089696, the contents of which are incorporated herein by reference.

TECHNICAL FIELD OF THE INVENTION

The present invention relates generally to a broadband wireless communication system. More particularly, the present invention relates to a method and an apparatus for supporting a plurality of Media Access Control (MAC) versions.

BACKGROUND OF THE INVENTION

Broadband wireless communication systems, currently under development, support very high rate wireless Internet based on Institute of Electrical and Electronics Engineers (IEEE) 802.16.

The IEEE 802.16 standard suggests diverse versions by reflecting various technical suggestions and standards. For example, the IEEE Standard (Std) 802.16-2004 concerns the air interface and describes the interface between a terminal and a base station of the physical layer and the Media Access Control (MAC) layer. The IEEE Std 802.16e-2005 describes the interfaces of the physical layer and the MAC layer in addition to the IEEE Std 802.16-2004 so as to support the mobility. The IEEE 802.16f-2005 defines the interface among network resources.

The IEEE standard documents are amended to enhance the performance, to correct operation scenario errors, or to clarify the interface; and then the draft versions are distributed. The draft versions are stabilized, through much discussion, and then formal versions are released. For example, the IEEE Std 802.16e-2005 includes the draft version documents of Corrigenda2. Currently, the IEEE 802.16 maintenance group is distributing the revision document, which is the unified document including the drafts of IEEE Std 802.16-2004, IEEE Std 802.16e-2005, IEEE Std 802.16f-2005 and Cor1, IEEE Std 802.16g-2007, and Corrigenda2.

As the IEEE 802.16 standard documents are amended and their new versions are released, WiMAX defines several criteria in the commercialization. The mobile WiMAX Rel 1.0, in the process of the commercialization, is based on the IEEE Std 802.16-2004, the IEEE Std 802.16e-2005 and Cor1, and the Corrigenda2 Draft-3. It is intended that the mobile WiMAX Rel 1.5 will be based on the revision document in progress.

The version may differ depending on a provider or an authentication profile. The system upgrade may cause the coexistence of multiple terminals having the different versions. In this respect, a network access scenario based on the different standard versions requires consideration. The current IEEE 802.16 standard defines that the standard versions supported by the base station and the terminal should be represented using MAC version Type-Length-Value (TLV). The base station should include the MAC version TLV in a broadcast message such as Downlink Channel Descriptor (DCD) and the terminal should include the MAC version TLV in a Ranging (RNG)-Request (REQ) message. For example, to support the IEEE Std 802.16-2004, the IEEE Std 802.16e-2005 and Cor1, and the Corrigenda2, the MAC version value is set to '6'. To support the IEEE Std 802.16-2004 and the IEEE Std 805.16e-2005 and Cor1 and not to support the Corrigenda2, the MAC version value is set to '5'. To support the IEEE Std 802.16-2008 of the Revision, the MAC version value is set to '8'.

When the MAC versions supported by the base station and the terminal are different from each other, the communication may be disapproved or the communication may be carried out with the low MAC version. Practically, in the system upgrade, the terminal supporting the old version may coexist with the terminal supporting the new version. It is necessary to concurrently support both of the terminal of the old version and the terminal of the new version until all of the terminals and the systems in the network are upgraded with the new version. Alternatively, it is necessary to support the multiple version at the same time by taking into account all of the system of the old version and the system of the new version. However, the current MAC version TLV value can represent only one of the versions supported by the terminal and the base station and cannot indicate which versions are supportable.

More particularly, since the conventional technique indicates only one version value in the DCD message and the RNG-REQ message, the possible scenarios for the base station and the terminal capable of supporting the multiple versions are quite restricted.

For instance, when the base station transmits the MAC version TLV value '6' of the DCD message and the terminal supporting the MAC versions '6' and '8' accesses to the corresponding network in the system capable of supporting the MAC version '6', the MAC version TLV value of the RNG-REQ message can be set to '8'. The system cannot know whether the terminal can support the MAC version '6' or not. Naturally, the communication of the terminal which accesses with the MAC version TLV not supported in the system is highly likely to be disapproved.

For example, it is assumed that the base station can support the MAC versions '5' and '8' and the terminal can support the MAC versions '5' and '6'. The base station sets the MAC version of the DCD message to '8' and the terminal sets the MAC version of the RNG-REQ message to '6'. In reality, while the base station and the terminal can communicate with each other with the MAC version '5', the communication is rejected because the version is not identified.

Therefore, when the broadband wireless communication system supports the plurality of the MAC versions, a method and an apparatus for avoiding the communication rejection caused by the version mismatch are demanded.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide a method and an apparatus for supporting a plurality of MAC versions in a broadband wireless communication system.

Another aspect of the present invention is to provide a method and an apparatus for avoiding access rejection caused by version mismatch when a broadband wireless communication system supports a plurality of MAC versions.

Yet another aspect of the present invention is to provide a method and an apparatus for efficiently matching MAC versions when a broadband wireless communication system supports the plurality of the MAC versions.

According to one aspect of the present invention, an operating method of a terminal to support a plurality of MAC versions in a broadband wireless communication system includes receiving a message including information of one or more MAC versions supported by a base station, from the base station; and sending information of one or more MAC versions supported by the terminal, to the base station using a message.

According to another aspect of the present invention, an operating method of a terminal to support a plurality of MAC versions in a broadband wireless communication system includes receiving a broadcast message that includes first MAC version information of a highest version supported by a base station; determining whether the terminal includes one or more supportable MAC versions equal to or lower than the first MAC version; transmitting a second MAC version value of the highest version among the one or more supportable MAC versions equal to or lower than the first MAC version, and information of one or more supportable MAC versions equal to or lower than the second MAC version using a ranging request message; and receiving a third MAC version value to use, from the base station using a ranging response message.

According to yet another aspect of the present invention, an operating method of a base station to support a plurality of MAC versions in a broadband wireless communication system includes transmitting a broadcast message which includes information of one or more first MAC versions supported by the base station, to a corresponding terminal; receiving a message which includes information of one or more second MAC versions supported by the corresponding terminal, from the corresponding terminal; and selecting a MAC version to use by comparing the first MAC version information and the second MAC version information.

According to still yet another aspect of the present invention, an operating method of a base station to support a plurality of MAC versions in a broadband wireless communication system includes broadcasting a first MAC version value which is a highest version of MAC versions supported by the base station, to a corresponding terminal; after sending the broadcast message, receiving a ranging request message that includes a second MAC version value, which is the highest version supported by the corresponding terminal, and information of one or more supportable MAC versions lower than the second MAC version; and determining a MAC version to use using MAC version information supported by the base station and MAC version information supported by the corresponding terminal, and transmitting the determined MAC version value using a ranging response message. The first MAC version may be higher than or equal to the second MAC version.

According to a further aspect of the present invention, an apparatus of a terminal to support a plurality of MAC versions in a broadband wireless communication system includes a receiver for receiving a broadcast message including information of one or more MAC versions supported by a base station, from the base station; and a ranging controller for sending information of one or more MAC versions supported by the terminal, to the base station using a message.

According to a further aspect of the present invention, an apparatus of a terminal to support a plurality of MAC versions in a broadband wireless communication system includes a receiver for receiving a broadcast message which includes first MAC version information of a highest version supported by a base station; a MAC version checker for determining whether there are one or more supportable MAC versions equal to or lower than the first MAC version; and a ranging controller for transmitting a second MAC version value of the highest version among the one or more supportable MAC versions equal to or lower than the first MAC version, and information of one or more supportable MAC versions equal to or lower than the second MAC version using a ranging request message, and receiving a third MAC version value to use, from the base station using a ranging response message.

According to a further aspect of the present invention, an apparatus of a base station to support a plurality of MAC versions in a broadband wireless communication system includes a transmitter for transmitting a broadcast message which includes information of one or more first MAC versions supported by the base station, to a corresponding terminal; and a controller for receiving a message which includes information of one or more second MAC versions supported by the corresponding terminal, from the corresponding terminal, and selecting a MAC version to use by comparing the first MAC version information and the second MAC version information.

According to a further aspect of the present invention, an apparatus of a base station to support a plurality of MAC versions in a broadband wireless communication system includes a transmitter for transmitting broadcast message including a first MAC version value which is a highest version supportable; and a ranging controller for receiving a ranging request message which includes a second MAC version value, which is the highest version supported by a corresponding terminal, and information of one or more supportable MAC versions lower than the second MAC version, determining a MAC version to use using MAC version information supported by the base station and MAC version information supported by the corresponding terminal, and transmitting the determined MAC version value using a ranging response message. The first MAC version may be higher than or equal to the second MAC version.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1A through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method and an apparatus for matching MAC version between a base station 10 and a terminal 20 when a broadband wireless communication system supports a plurality of MAC versions.

Figure 1A:
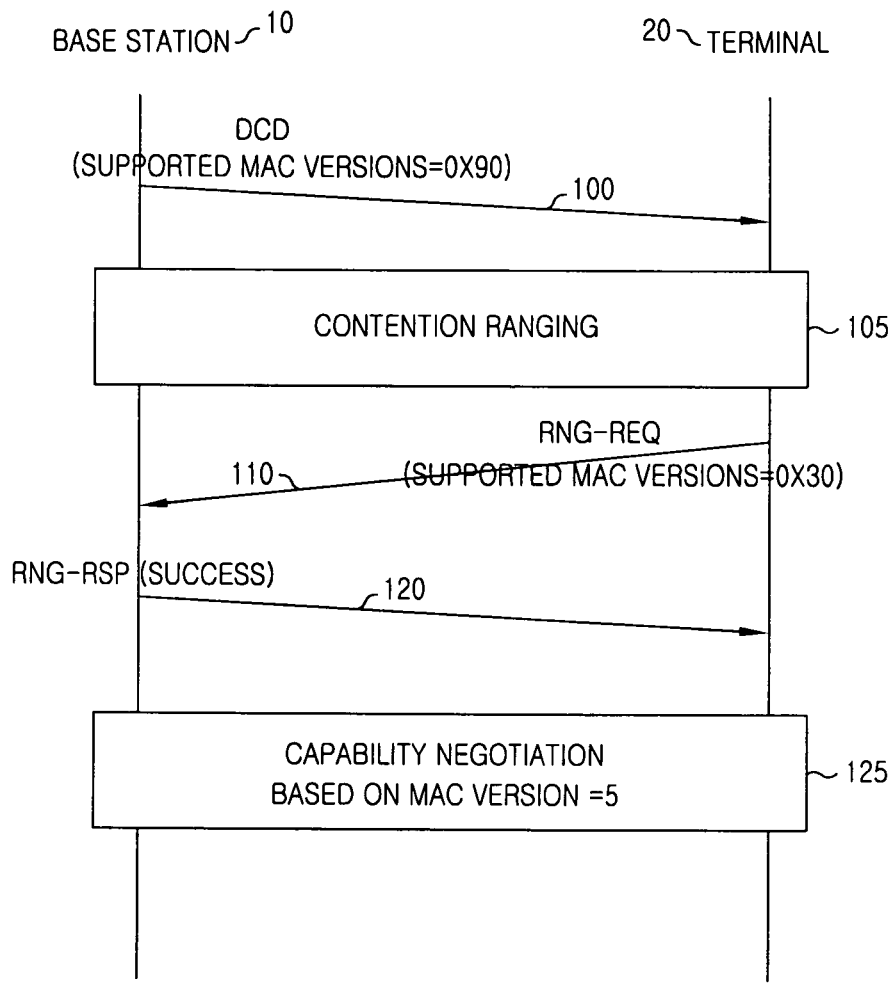
FIGS. 1A and 1B illustrate MAC version match in a broadband wireless communication system according to an exemplary embodiment of the present invention.
Figure 1B:
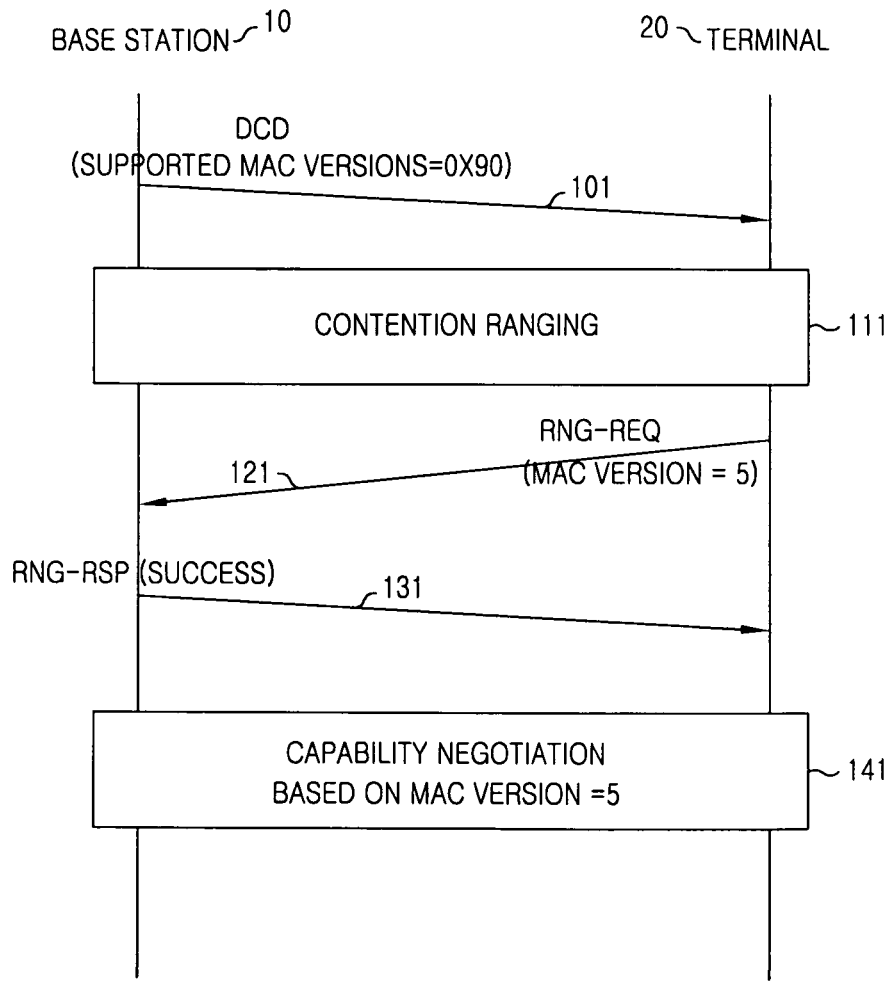

FIGS. 1A and 1B illustrate the MAC version match in the broadband wireless communication system according to one exemplary embodiment of the present invention.

According to one exemplary embodiment, various operation scenarios are supported by representing the versions supportable by the base station and the terminal. The supported MAC versions of Table 1 can be contained in a DCD message and a RNG-REQ message in the TLV format, and can indicate the plurality of the supported MAC versions.

TABLE 1

| Type | Length | Value |
|---|---|---|
| Supported MAC versions xx | variable | If multiple MAC version can be supported, this TLV may be included. Bit #n is an indication to support MAC version value (n + 1) and the value of '1' means to support the value of MAC version TLV. If Bit #5 is '1', MAC version TLV value of '6' is supported. |

In Table 1, the bits of the supported MAC version TLV value indicate whether the corresponding MAC versions are supported or not. That is, given m-ary MAC versions, the bit #n indicates whether the MAC version TLV value (n+1) is supported or not using a bitmap (0~(m−1) bits in size). For example, the bit #0 of '1' indicates the support of the MAC version '1'. The base station 10, which supports the MAC versions '5' and '8', sets the supported MAC versions value to 0x90 with the bit #4 of '1' and the bit #7 of '1'; that is, '10010000' in the bitmap where the fourth and seventh bits from the right are set to '1' and the other bits are set to '0'.

FIGS. 1A and 1B show the support of the plurality of the MAC versions using the supported MAC version TLV of Table 1 in the broadband wireless communication system of the present invention.

Referring first to FIG. 1A, the base station 10 supporting the MAC versions '5' and '8' sends the DCD message including the supported MAC versions TLV defined to 0x90 with one (1) byte to the terminal 20 in step 100. In step 105, the terminal is assigned the ranging resource from the base station 10 through a contention ranging procedure between the base station 10 and the terminal 20.

In step 110, the terminal 20 supporting the MAC versions '5' and '6' defines the supported MAC versions TLV of the RNG-REQ message to 0x30 with one (1) byte (00110000 in the bitmap). That is, the terminal 20 capable of supporting the multiple MAC versions informs that the MAC versions '5' and '6' are supported by setting the supported MAC versions TLV value of the RNG-REQ message to 0x30.

The terminal 20 and the base station 10 can communicate with the highest value of the supportable MAC version values. Namely, after sending and receiving the RNG-REQ message of the supported MAC versions 0x30, the base station 10 and the terminal 20 operate based on the IEEE Std 802.16-2004 and the IEEE Std 802.16e-2005 of the MAC version '5'.

As such, the base station 10 supporting the multiple versions informs that it supports the MAC versions '5' and '8' by setting the supported MAC versions TLV value of the DCD message to 0x90. The terminal 20 capable of supporting the multiple MAC versions informs that it supports the MAC versions '5' and '6' by setting the supported MAC versions TLV value of the RNG-REQ message to 0x30.

Next, the base station 10, upon successfully receiving the RNG-REQ message, responds with an RNG-Response (RSP) message (status=success) in step 120. In step 125, the base station 10 and the terminal 20 communicate and operate based on the MAC version '5'.

Alternatively, the terminal 20, receiving the supported MAC versions TLV of the DCD message, can determine the MAC version for the communication in advance and send the RNG-REQ message by setting the MAC version TLV to '5'.

Referring to FIG. 1B, the base station 10 supporting the MAC versions '5' and '8' sends the DCD message including the supported MAC versions TLV defined to 0x90 with one (1) byte to the terminal 20 in step 101. In step 111, the terminal 20 is assigned the ranging resource from the base station 10 through the contention ranging procedure between the base station 10 and the terminal 20.

In step 121, the terminal 20 supporting the MAC versions '5' and '6' may pre-determine the MAC version and send the RNG-REQ message by setting the MAC version TLV to '5', rather than defining the supported MAC versions TLV of the RNG-REQ message to 0x30 with one (1) byte.

Next, the base station 10, upon successfully receiving the RNG-REQ message, responds with the RNG-RSP message (status=success) in step 131. In step 141, the base station 10 and the terminal 20 communicate and operate based on the MAC version '5'.

Meanwhile, when the base station 10 supports the multiple MAC versions and the terminal 20 supports one version, the terminal 20 adds only the MAC version TLV to the RNG-REQ message or sets only one bit for the supported MAC versions TLV. When the base station 10 can support the MAC version of the terminal 20, it approves the communication through the RNG-RSP message and communicates based on the version of the terminal 20. While the MAC versions of the base station 10 and the terminal 20 match in FIG. 1, the base station 10 may not support the MAC version of the terminal 20 and disapprove the communication through the RNG-RSP message. Hereafter, the MAC version mismatch of the base station 10 and the terminal 20 is described by referring to FIGS. 2A and 2B.

Figure 2A:
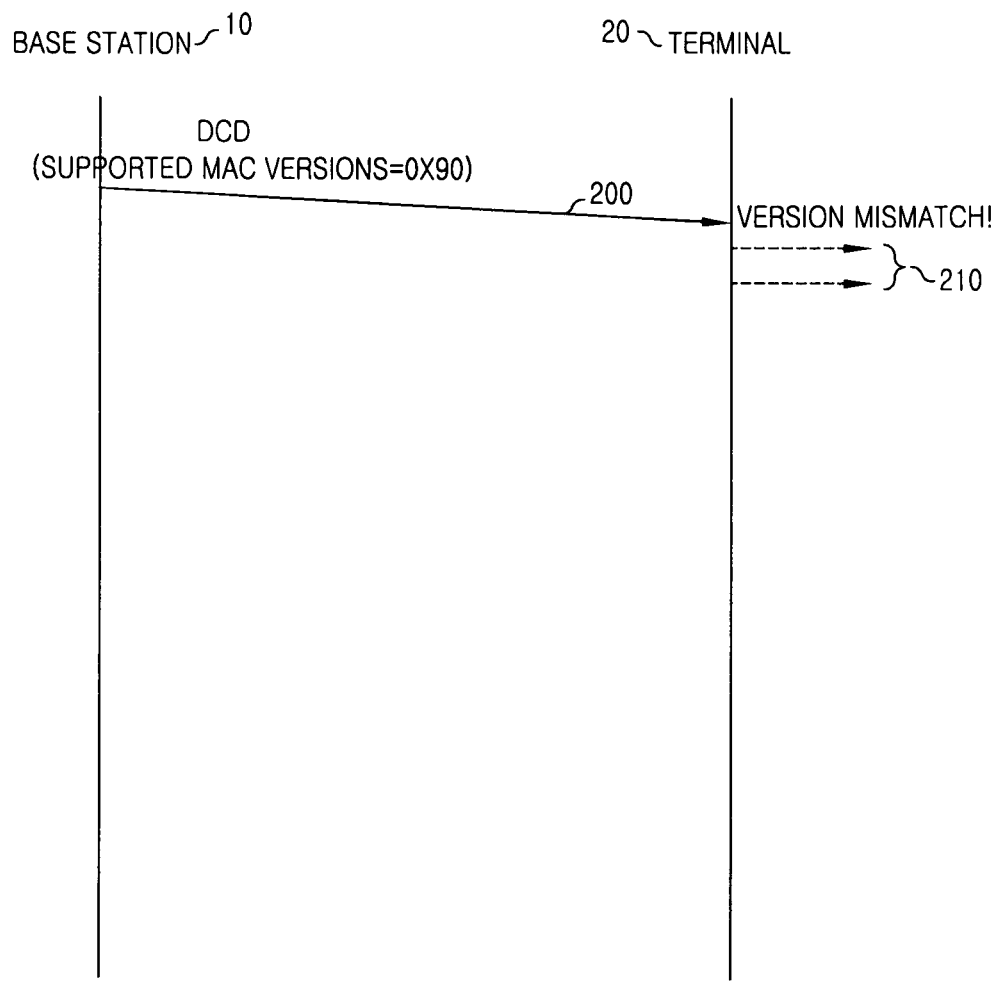
FIGS. 2A and 2B illustrate MAC version mismatch according to an exemplary embodiment of the present invention.
Figure 2B:
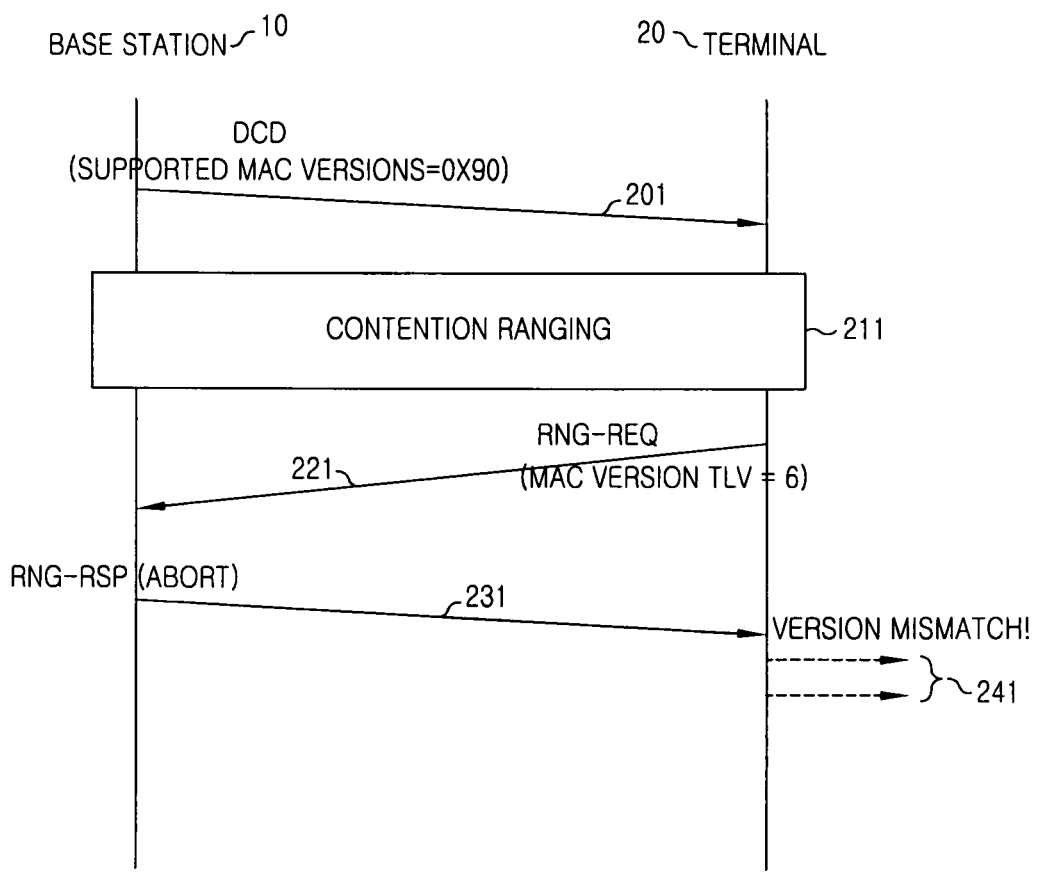

FIGS. 2A and 2B illustrate the MAC version mismatch according to an exemplary embodiment of the present invention.

Referring to FIG. 2A, the base station 10, which supports the plurality of the versions, informs that it supports the MAC versions '5' and '8' by setting the supported MAC versions TLV value of the DCD message to 0x90 in step 200. Upon receiving the supported MAC versions TLV of the DCD message, the terminal 20 determines that the current version mismatch with the base station 10, disables the communication, does not attempt the ranging, and notifies the user of the communication failure with the corresponding base station 10 in step 210.

Referring to FIG. 2B, the base station 10, which supports the MAC versions '5' and '8', sends the DCD message to the terminal 20 by setting the supported MAC versions TLV value to 0x90 with one (1) byte in step 201. In step 211, the terminal 20 is assigned the ranging resource from the base station 10 through the contention ranging procedure between the base station 10 and the terminal 20.

In step 221, the terminal 10 supporting one MAC version can set the MAC version TLV value of the RNG-REQ message to '6', or set and send the supported MAC versions TLV to 0x20 (0010 0000).

In step 231, the base station 10, upon successfully receiving the RNG-REQ message, can respond with the RNG-RSP (status=abort) to disapprove the communication because of the version mismatch with the terminal 20, or add new base station 10 information such as frequency TLV or preamble index to the RNG-RSP (status=abort) to lead to the access to a base station 10 capable of supporting the corresponding version (the MAC version 6). The access lead to the new base station 10 is the same as in the conventional method, and the terminal 20 can attempt the access to the new base station 10 using the base station information received together with the RNG-RSP (status=abort).

In step 241, receiving the RNG-RSP (status=abort) message, the terminal 20 notifies the user of the version mismatch or attempts the network access to another base station 10 using information of the another base station.

Figure 3:
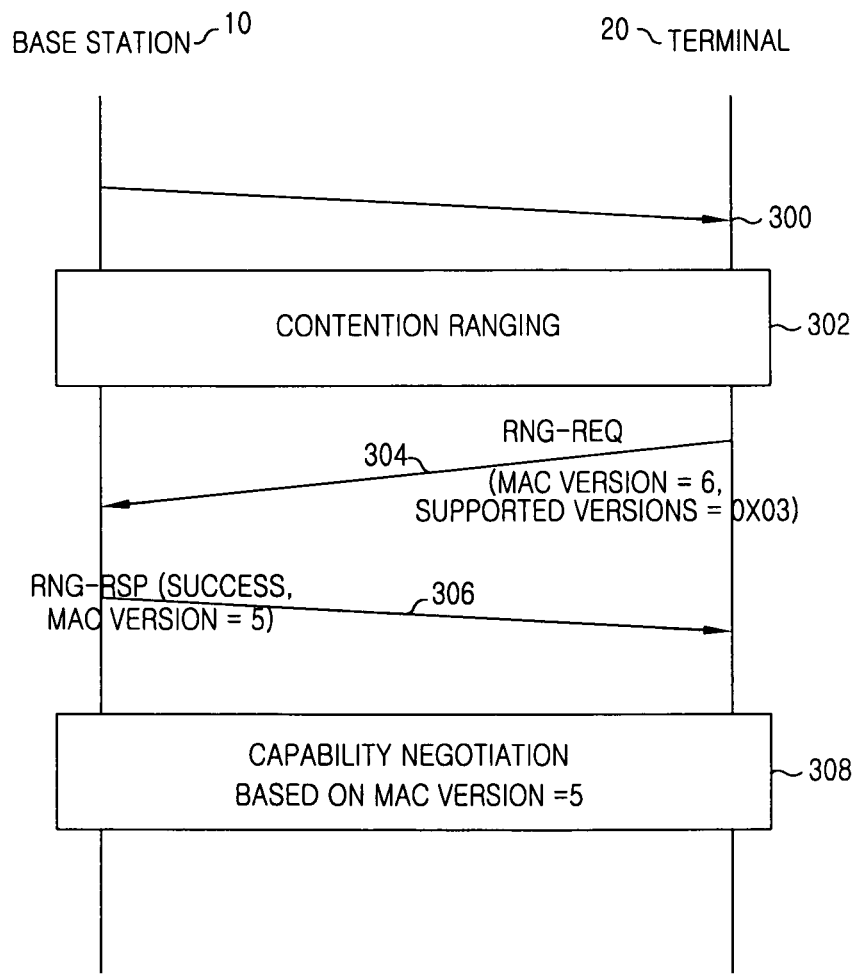
FIG. 3 illustrates MAC version match in the broadband wireless communication system according to an exemplary embodiment of the present invention.

FIG. 3 illustrates MAC version match in the broadband wireless communication system according to an exemplary embodiment of the present invention.

In another exemplary embodiment, the supported version negotiation is added to the ranging procedure. The base station 10 supporting the multiple versions sends the DCD message by setting the highest version value in the MAC version TLV. When the supportable version of the terminal 20 is lower than the MAC version value of the DCD message, the ranging is attempted. The version supported TLV of Table 2 can be added to the RNG-REQ message and the RNG-RSP message.\

TABLE 2

| Type | Length | Value |
|---|---|---|
| Version supported | xx | variable | indicates the supported MAC versions and this TLV is only included with MAC version TLV. If the value of MAC version TLV is n, bit #0 means to support MAC version n and bit #m to support MAC version (n − m). |

In Table 2, the terminal 20 adds the highest version value of its supportable versions to the MAC version TLV of the RNG-REQ message. The version supported TLV is included together and its value indicates the supportable versions below the MAC version TLV value. When the MAC version TLV is in the value of n, the bit #0 of the version supported TLV indicates the support of the MAC version n and the bit #1 indicates the support of the MAC version n−1. The base station 10 can confirm the supportable version of the terminal 20 from the MAC version TLV and the version supported TLV of the RNG-REQ message and determine the communicable version. The base station 10 sends the RNG-RSP (status=success) message by setting the MAC version TLV to the communicable version. Upon determining the communication rejection because of the version mismatch, the base station 10 can indicate its supportable versions in the version supported TLV when sending the RNG-RSP (status=abort), which can be set based on the MAC version TLV value of the DCD message.

In various implementations, the format of the MAC versions supported TLV of Table 3 can be used.

TABLE 3

| Type | Length | Value |
|---|---|---|
| MAC version supported | xx | variable | bit#0~bit#7: M, the highest version value supported. bit#8~bit#n: If multiple MAC version can be supported, it #(n − 8) is an indication to support MAC version value (M − n + 8) and the value of the bit means to support the value of MAC version |

TABLE 3-continued

| Type | Length | Value |
|------|--------|-------|
|      |        | TLV. If bit#8 = 1 and bit#10 = 1, MAC version of M and (M − 2) are supported. |

In Table 3, the MAC versions supported TLV includes the MAC version and the version supported information in one TLV. The MAC version supported TLV is of the variable length. The base station 10 or the terminal 20 supporting the multiple versions represents its highest version value with the Least Significant Byte (LSB) and the other supportable versions with other bits. That is, the highest version value is indicated by 0~7 (8 bits) and 8~n bits indicate the supportable MAC versions from the highest version. For example, provided that M is the highest version and M and M−2 are supported in the descending order, the eighth and tenth bit values are '1'.

Referring back to FIG. 3, the base station 10 which supports the MAC versions '5' and '8' sends the DCD message by setting the MAC version TLV to '8' in step 300. The terminal 20 which supports the MAC versions '5' and '6' can identify the MAC version value of the DCD message and attempt the ranging in step 302.

In step 304, the terminal 20 sends the RNG-REQ message by setting the MAC version TLV to '6' and the version supported TLV of Table 2 or Table 3 to 0x03 (00000011). More specifically, the terminal 20 informs the base station 10 that it supports the MAC versions '5' and '6' by recording the version for supporting the MAC version TLV (the MAC version 6) and the first and second bits from the right of the MAC version '6' as '1'.

In step 306, the base station 10, upon receiving the RNG-REQ message, can determine that the terminal 20 can support the MAC versions '5' and '6', and communicate based on the MAC version '5'. For doing so, the base station 20 includes the MAC version TLV to the RNG-RSP message and sets the MAC version TLV value to '5'. In step 308, the base station 20 and the terminal 10 perform the access procedure and the operations based on the MAC version '5'.

Figure 4:
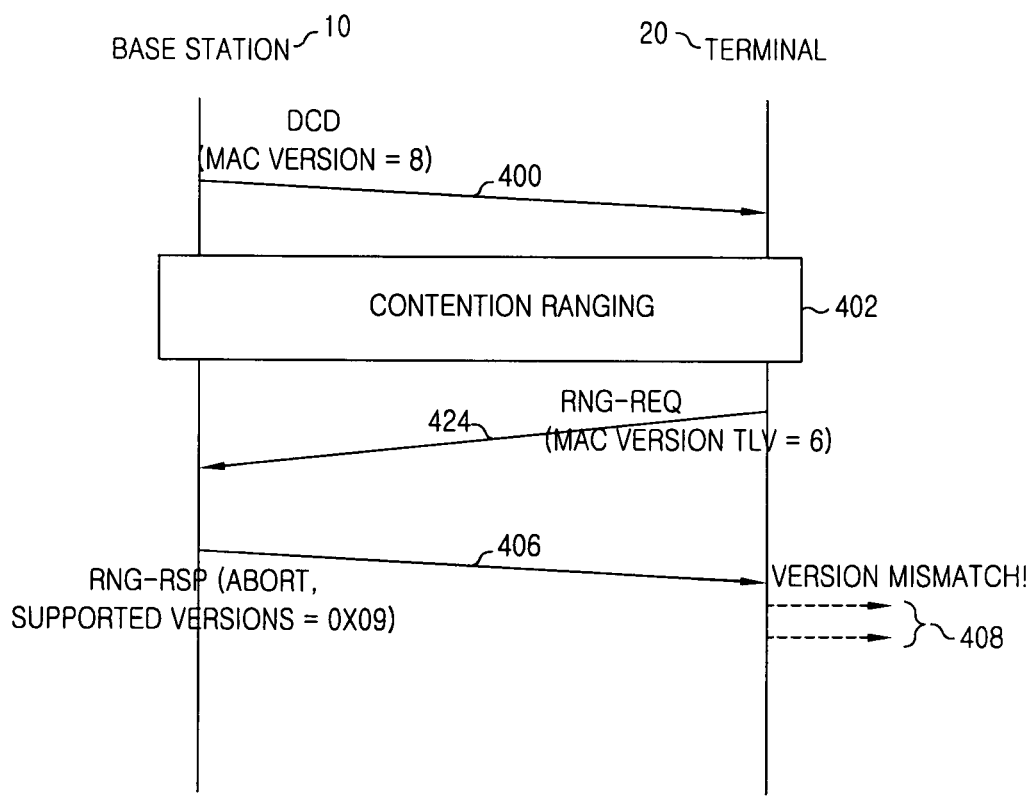
FIG. 4 illustrates MAC version mismatch in the broadband wireless communication system according to an exemplary embodiment of the present invention.

FIG. 4 illustrates the MAC version mismatch in the broadband wireless communication system according to an exemplary embodiment of the present invention.

The base station 10 that supports the MAC versions '5' and '8' sends the DCD message by setting the MAC version TLV to '8' in step 400. The terminal 20 that supports the MAC version '6' can identify the MAC version value of the DCD message and attempt the ranging in step 402.

In step 404, the terminal 20 sends the RNG-REQ message by indicating the MAC version TLV of '6'. Upon receiving the RNG-REQ message, the base station 10 can reject the communication because of the version mismatch in step 406. The RNG-RSP message is transmitted with "status=abort" and includes the version supported TLV of 0x09 (00001001), which implies that the base station 10 supports the MAC versions '5' and '8'. The terminal 20 can inform the user of the communication rejection because of the version mismatch.

Alternatively, according to yet another embodiment of the present invention, the MAC versions TLV of Table 4 is carried by the DCD message and the RNG-REQ message. The suggested MAC versions TLV can be of a variable length depending on the version supported by the terminal 20 and the base station 10. The version approval or disapproval is indicated by the bitmap in FIG. 1 according to one exemplary embodiment, whereas the supportable version is indicated by the MAC versions TLV in yet another exemplary embodiment.

TABLE 4

| Type | Length | Value |
|------|--------|-------|
| MAC versions | xx | variable | Each byte indicates the version number of IEEE 802.16 supported. Least significant byte can be the highest version value. |

In Table 4, the terminal 20 or the base station 10 supporting the plurality of the versions, records all of its supported versions in the MAC versions TLV, where the highest version is indicated by the Least Significant Byte (LSB). The terminal 20 or the base station 10 supporting one version includes a 1-byte MAC versions TLV.

Upon confirming the supportable version from the DCD message, the terminal 20 determines whether to attempt the ranging, and indicates the supportable version in the MAC versions TLV of the RNG-REQ message. When the base station 10 receives the RNG-REQ message and intends to reject the communication because of the version mismatch, the base station 10 can send the RNG-RSP (status=abort). By including a status indication as shown in Table 5, the reason of the communication rejection can be informed to prevent the subsequent unnecessary access attempts. When the base station 10 induces to access to another base station or when the communication is feasible, the base station 10 sends the RNG-RSP (status=success) message and the terminal 20 and the base station 10 communicate with each other in the highest version supported by both of the terminal 20 and the base station 10.

TABLE 5

| Type | Length | Value |
|------|--------|-------|
| Status indication | xx | 1 | 0: Reserved<br>1: Communication declined by MAC version mismatch.<br>2~255: Reserved |

When the status indication is '1', the communication rejection because of the MAC version mismatch is informed.

In this yet another exemplary embodiment, the operations are explained in brief without drawings. The base station 10, which supports the MAC versions '5' and '8', sets the MAC versions TLV of the DCD to 0x0508 with 2 bytes, and the terminal 20 supporting the MAC versions '5' and '6' sets the MAC versions TLV of the RNG-REQ to 0x506 with 2 bytes. Upon receiving the DCD message, the terminal 20 confirms the supportable versions of the base station 10, and attempts the ranging or informs the user of the communication access termination because of the version mismatch. The terminal 20, which attempts the ranging, informs the base station 10 of its supportable versions using the MAC versions TLV and confirms the reception of the RNG-RSP. The terminal 20, upon receiving the RNG-RSP (status=success), can proceed with the communication based on the MAC version '5'. The terminal receiving the RNG-RSP (status=abort) confirms the access induction information to the other base station and the status indication value. When the status indication TLV of '1' is contained, the communication is rejected because of the version mismatch, and there is no access induction information to the other base station, the terminal informs the user of the access attempt termination.

Figure 5:
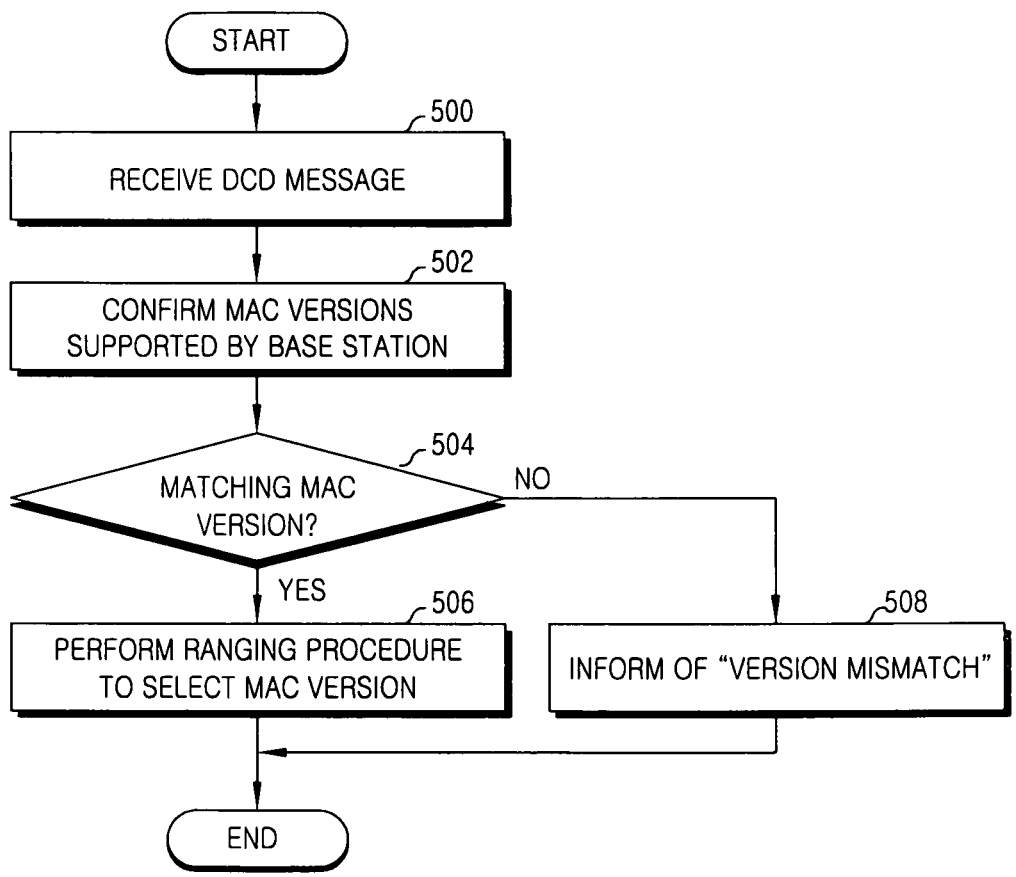
FIG. 5 illustrates operations of a terminal for matching the MAC version in the broadband wireless communication system according to an exemplary embodiment of the present invention.

FIG. 5 illustrates a flowchart outlining the operations of the terminal for matching the MAC version in the broadband wireless communication system according to an exemplary embodiment of the present invention; that is, the operations of the terminal using the supported MAC versions TLV (see Table 1).

In step 500, the terminal receives the DCD message from the base station. Receiving the DCD message, the terminal determines whether the MAC versions supported by the base station include the supportable MAC version value of the terminal by examining the supported MAC versions TLV in step 502.

Figure 6:
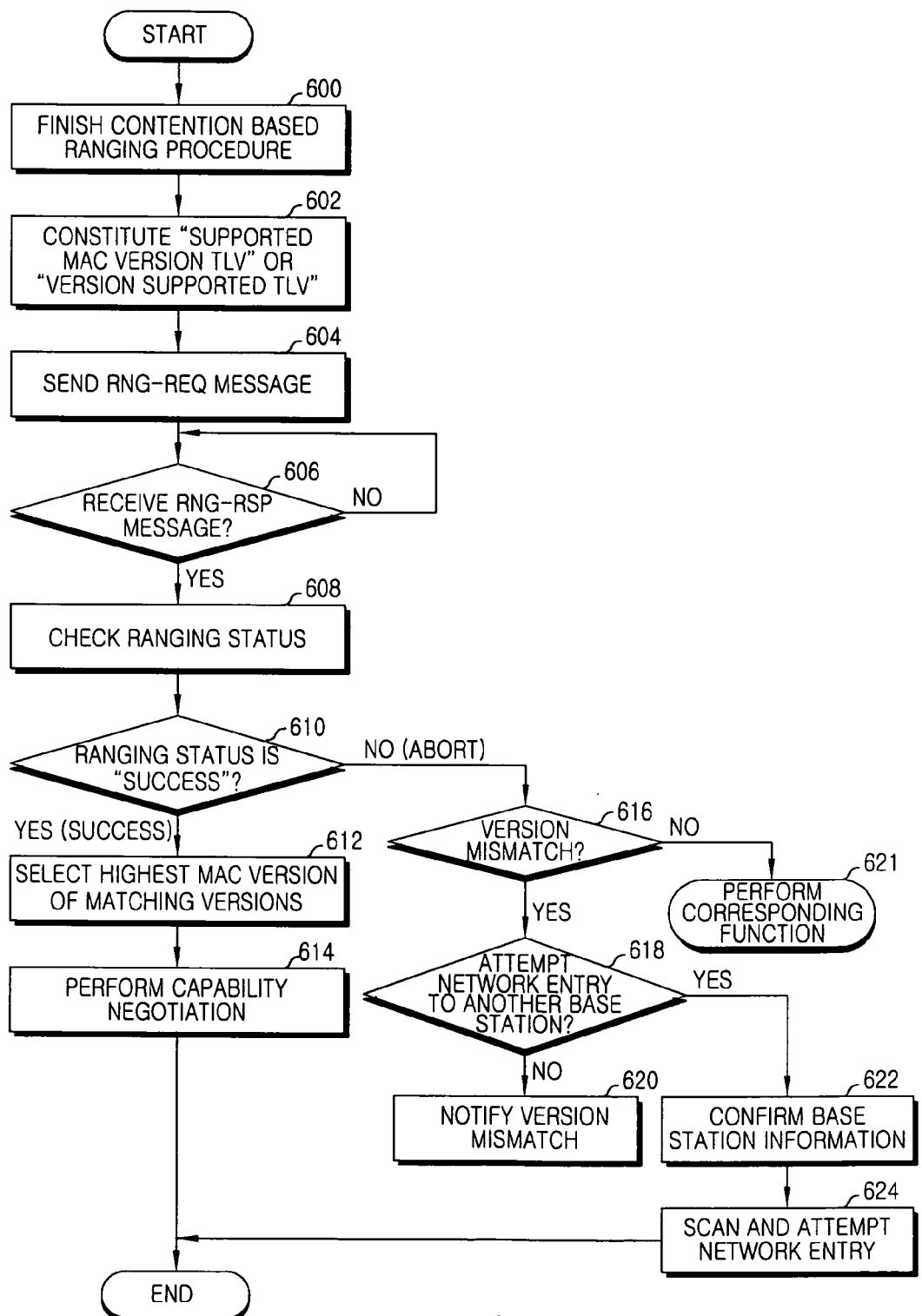
FIG. 6 illustrates a ranging procedure of the terminal for matching the MAC version in the broadband wireless communication system according to an exemplary embodiment of the present invention.

When detecting the matching MAC version in step 504, the terminal attempts the ranging procedure in step 506, which can be described in more detail by referring to FIG. 6.

When detecting no matching MAC version, the terminal informs the user of the version mismatch and terminates the network access attempt in step 508.

FIG. 6 illustrates a flowchart of the ranging procedure of the terminal for matching the MAC version in the broadband wireless communication system according to an exemplary embodiment of the present invention.

The terminal finishes the contention based ranging procedure in step 600. When the uplink resource for transmitting the RNG-REQ message is assigned, the terminal adds the supported MAC versions TLV or the MAC version TLV to the RNG-REQ message in step 602, and sends the RNG-REQ message in step 604. In so doing, when the terminal supports a plurality of MAC versions, the terminal informs the support of the multiple MAC versions by constituting the supported MAC versions TLV of Table 1. When the terminal supports only one MAC version, the terminal informs its supported MAC version by constituting the MAC version TLV similar to the conventional method.

When receiving the RNG-RSP message in response to the RNG-REQ message in step 606, the terminal checks the ranging status of the RNG-RSP message in step 608. When the base station accepts the RNG-REQ message, the base station sets the ranging status to "success". When the base station does not accept the RNG-REQ message, the base station sends the RNG-RSP message by setting "abort".

When the ranging status is "success" in step 610, the terminal communicates with the base station using the highest MAC version supportable in step 612 and carries out the capability negotiation in step 614.

Alternatively, when the ranging status is "abort" in step 610 and the version mismatch is identified from the supported MAC versions TLV of the DCD message in step 616, the terminal determines whether the RNG-RSP message includes the information of the access induction to another base station in step 618. When there is no access induction information, the terminal informs the user of the version mismatch and terminates the network access attempt in step 620. When the corresponding information is detected in step 621, the terminal confirms the base station information in step 622 and performs the scanning and the network entry procedure using the corresponding information of the another base station in step 624.

Next, the terminal finishes this process.

Figure 7:
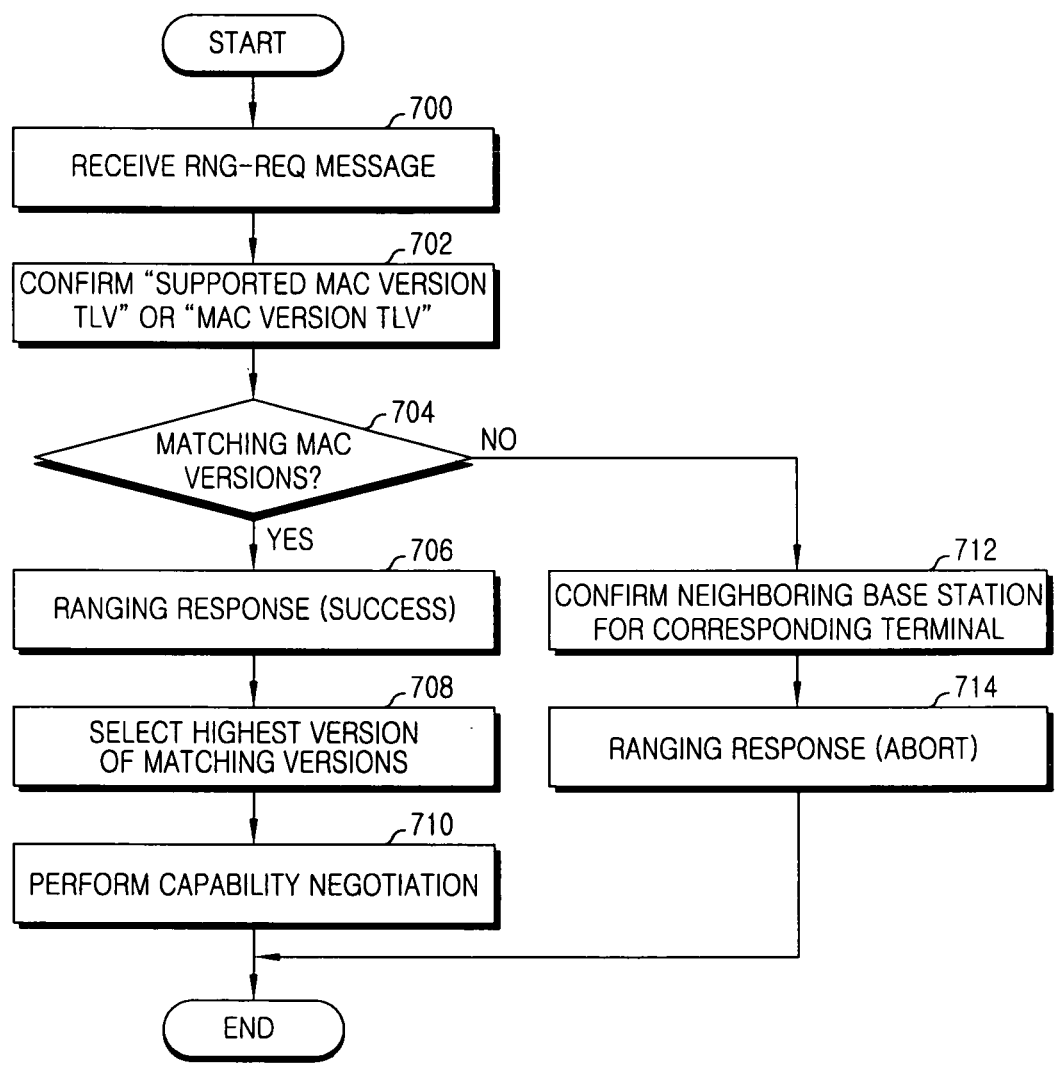
FIG. 7 illustrates operations of a base station for matching the MAC version in the broadband wireless communication system according to an exemplary embodiment of the present invention.

FIG. 7 illustrates a flowchart outlining operations of the base station for matching the MAC version in the broadband wireless communication system according to an exemplary embodiment of the present invention.

The base station receives the RNG-REQ message in step 700 and confirms the versions supported by the terminal from the supported MAC versions TLV or the MAC version TLV of the RNG-REQ message in step 702.

When detecting the communicable version in step 704, the base station sends the RNG-RSP message (status=success) in step 706, communicates with the terminal in the highest supportable version in step 708, and performs the capability negotiation in step 710.

Alternatively, when detecting no version for the communication with the terminal in step 704, the base station confirms neighboring base station information for the corresponding terminal in step 712 and induces the access to another base station by sending the RNG-RSP message (status=abort) in step 714. In various implementations, when detecting no version for the communication with the terminal in step 704, the base station can reject the access using the RNG-RSP message.

Figure 8:
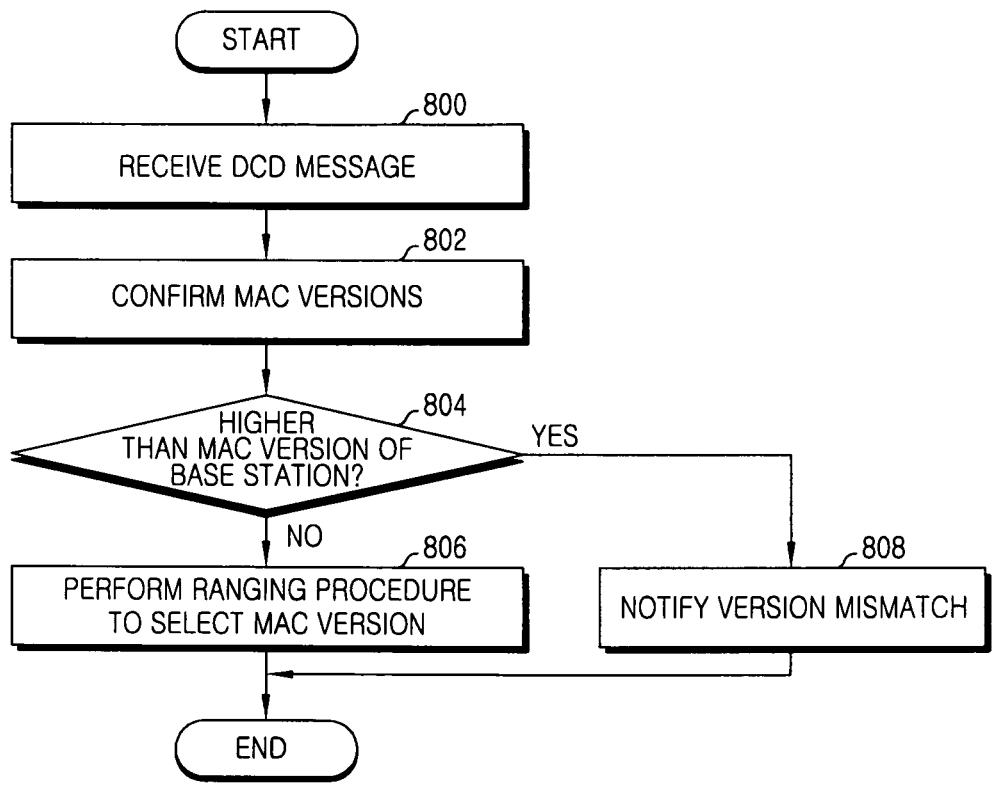
FIG. 8 illustrates operations of the terminal for matching the MAC version in the broadband wireless communication system according to an exemplary embodiment of the present invention.

FIG. 8 illustrates a flowchart outlining operations of the terminal for matching the MAC version in the broadband wireless communication system according to an exemplary embodiment of the present invention; that is, the operations of the terminal using the version supported TLV (see Table 2 or Table 3).

When the base station sends the DCD message by recording the highest value of its supportable versions in the MAC version TLV, the terminal receives the DCD message from the base station in step 800.

The terminal receiving the DCD message confirms the MAC version TLV in step 802, and determines whether the MAC versions supported by the base station includes the MAC version values supported by the terminal in step 804.

When detecting the MAC version which supports below the MAC version TLV value in step 804, the terminal attempts the ranging in step 806, which is explained in more detail by referring to FIGS. 9A and 9B.

Alternatively, when all of the supportable versions of the terminal are higher than the MAC version TLV value of the base station in step 804, the terminal informs the user of the version mismatch and terminates the access attempt in step 808.

Figure 9A:
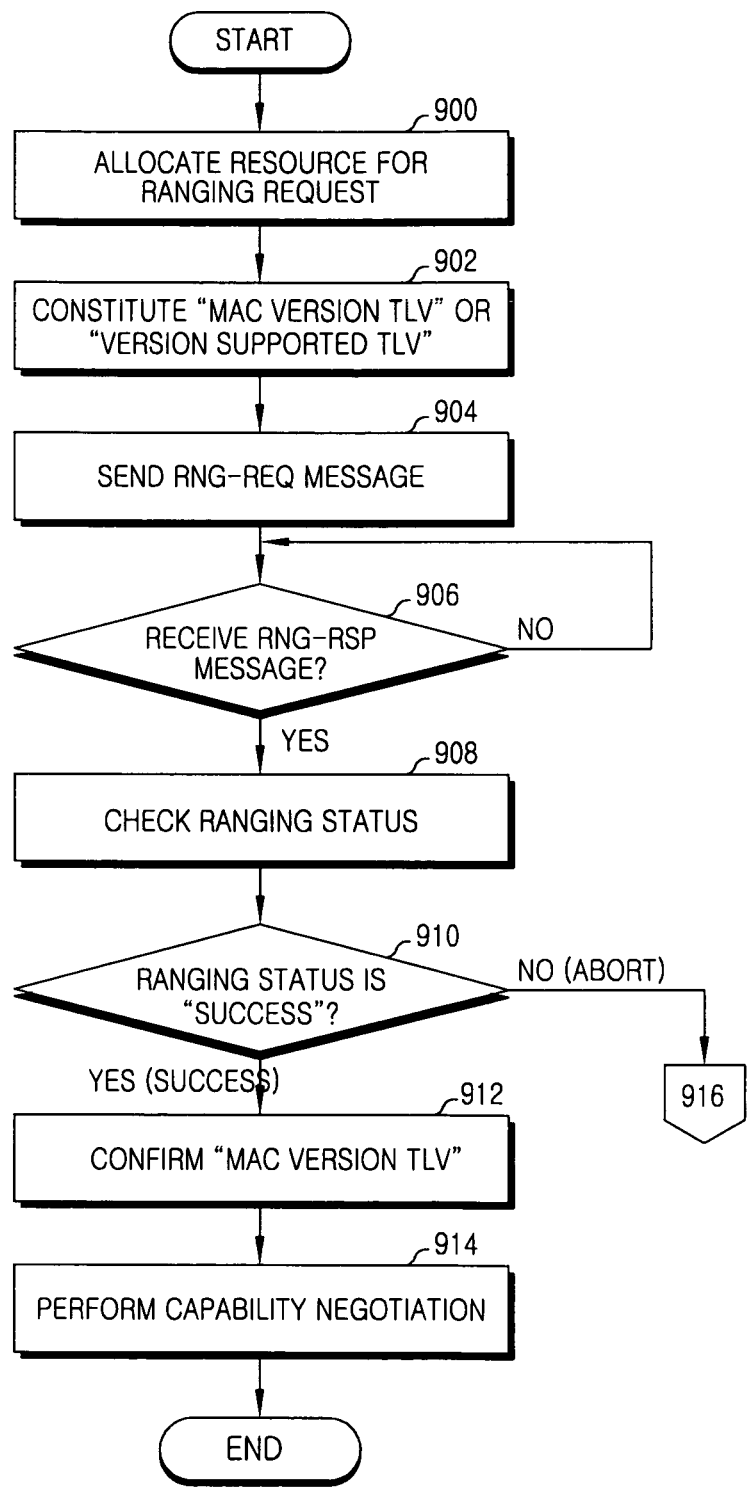
FIGS. 9A and 9B illustrate a ranging procedure of the terminal for matching the MAC version in the broadband wireless communication system according to an exemplary embodiment of the present invention.
Figure 9B:
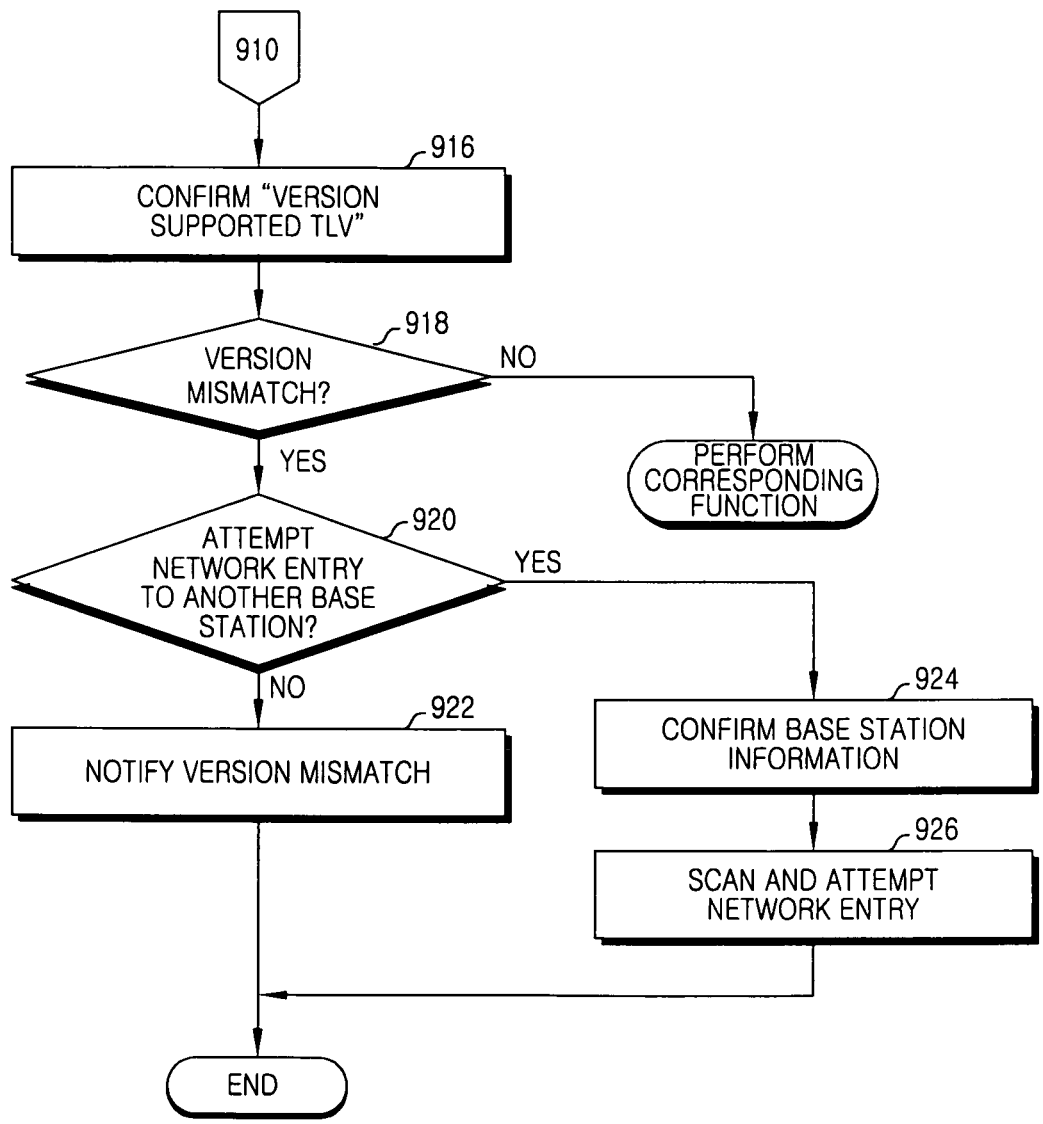

FIGS. 9A and 9B illustrate flowcharts outlining the ranging procedure of the terminal for matching the MAC version in the broadband wireless communication system according to an exemplary embodiment of the present invention When the terminal finishes the contention based ranging procedure and is assigned the uplink resource for sending the RNG-REQ message in step 900, the terminal records its highest supportable version value in the MAC version TLV of the RNG-REQ message and additionally adds the MAC version supported TLV when the multiple versions are supported in step 902 (see FIGS. 3 and 4). Additionally, the terminal transmits the RNG-REQ message in step 904 to a base station.

When receiving the RNG-RSP message in response to the RNG-REQ message in step 906, the terminal confirms the ranging status of the RNG-RSP message in step 908. When the base station can accept the RNG-REQ message, it sets the ranging status to "success". When the base station cannot accept the RNG-REQ message, it sends the RNG-RSP message by setting "abort".

When the ranging status is "success" in step 910, the terminal confirms the MAC version TLV of the RNG-RSP message in step 912 and carries out the communication and the operation (e.g., capability negotiation) using the corresponding version value in step 914.

By contrast, when the ranging status is "abort" in step 910, the terminal can identify the supportable versions of the base station from the MAC version supported TLV of the RNG-RSP message in step 916.

In case of the mismatch with the MAC version of the MAC version supported TLV of the base station in step 918, the terminal determines whether to attempt the network entry to another base station in step 920.

Determining not to attempt the network entry to another base station, the terminal informs the user of the version mismatch in step 922 and terminates the network access attempt. Alternatively, to attempt the network entry to another base station, the terminal confirms the base station information in step 924 and executes the scanning and the network entry procedure using information of the corresponding another base station in step 926.

Next, the terminal finishes this process.

Figure 10:
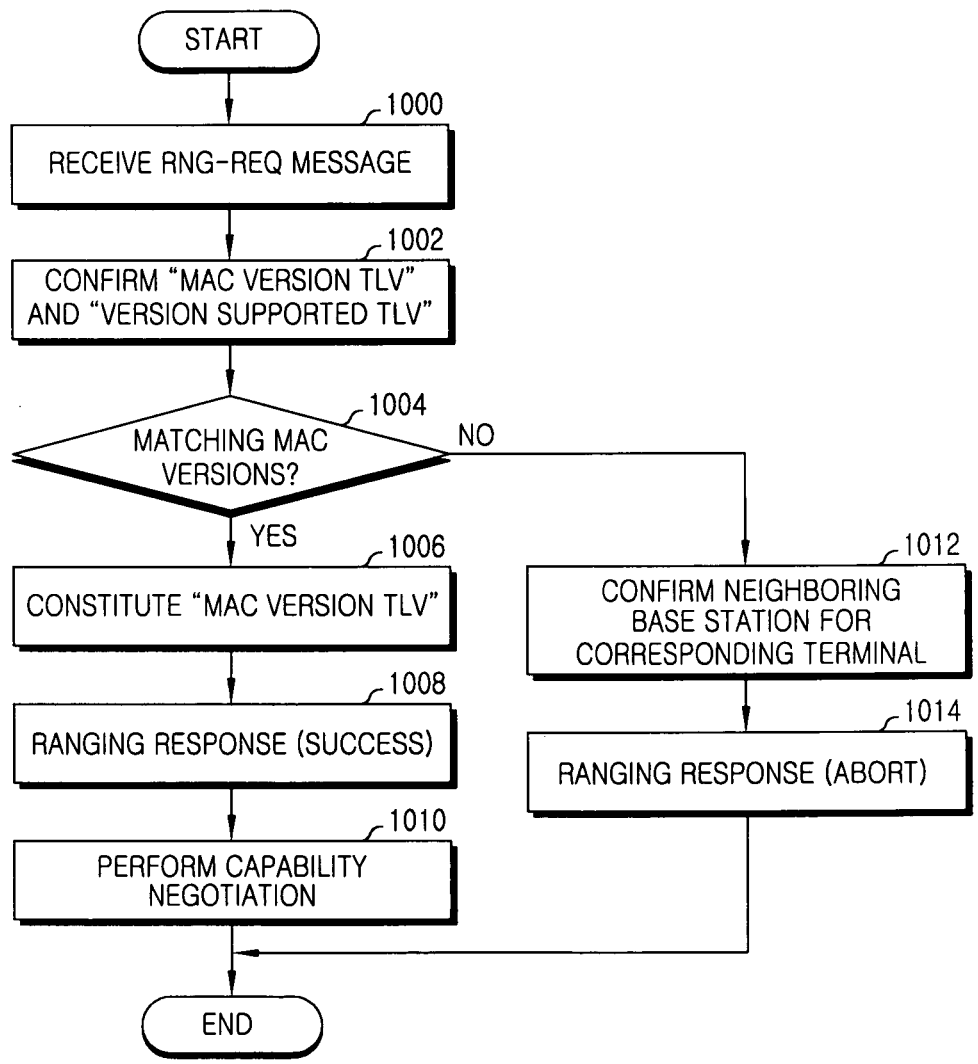
FIG. 10 illustrates operations of the base station for matching the MAC version in the broadband wireless communication system according to an exemplary embodiment of the present invention.

FIG. 10 illustrates a flowchart of operations of the base station for matching the MAC version in the broadband wireless communication system according to an exemplary embodiment of the present invention; that is, the operations of the base station using the version supported TLV of Table 2 or Table 3.

The base station receives the RNG-REQ message in step 1000 and identifies the version supported by the terminal from the version supported TLV and the MAC version TLV in step 1002.

When the version matches the MAC version of the terminal in step 1004, the base station constitutes the MAC version TLV in relation to the corresponding MAC version of the matching versions in step 1006, sends the RNG-RSP message (status=success) in step 1008, and performs the capability negotiation in the corresponding version supportable with the terminal in step 1010.

When the version does not match the MAC version of the terminal in step 1004, the base station rejects the access by sending the RNG-RSP message (status=abort) in step 1014. In various implementations, the base station may induce the access to another base station that can support the communication with the terminal. For example, in step 1012 added, the base station can confirm the neighboring base station information for the corresponding terminal and lead to the access to another neighboring base station by sending the RNG-RSP message including the neighboring base station information.

In various embodiments, the terminal supporting the plurality of the MAC versions can match the MAC version by altering the supportable MAC versions one by one until its version matches the MAC version of the base station. For example, when the base station supports the MAC versions 5 and 7 and the terminal supports the MAC versions 5 and 8, the terminal attempts the communication first using the MAC version 8. When the version mismatch does not allow the communication, the terminal attempts the communication using the MAC version 5, to thus match the MAC version.

Figure 11:
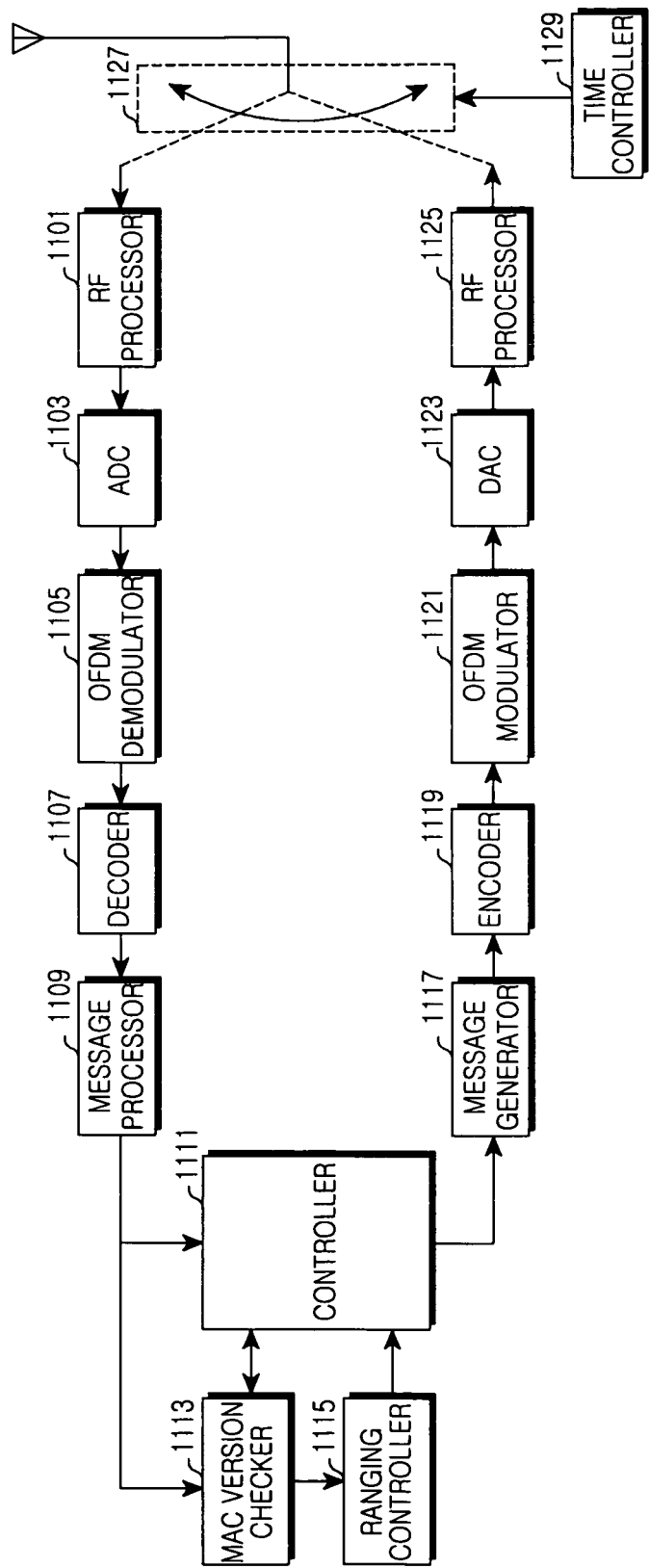
FIG. 11 illustrates an apparatus for matching the MAC version in the broadband wireless communication system.

FIG. 11 illustrates an apparatus for matching the MAC version in the broadband wireless communication system. The apparatus can be the terminal or the base station.

The apparatus of FIG. 11 includes a Radio Frequency (RF) processor 1101, an Analog/Digital Converter (ADC) 1103, an Orthogonal Frequency Division Multiplexing (OFDM) demodulator 1105, a decoder 1107, a message processor 1109, a controller 1111, a MAC version checker 1113, a ranging controller 1115, a message generator 1117, an encoder 1119, an OFDM modulator 1121, a Digital/Analog Converter (DAC) 1123, and an RF processor 1125.

A time controller 1129 controls the switching operation of a switch 1127 based on the frame synchronization. For example, in the signal reception interval, the time controller 1129 controls the switch 1127 to interconnect an antenna and the RF processor 1101 of the receiving stage. In the signal transmission interval, the time controller 1129 controls the switch 1127 to interconnect the antenna and the RF processor 1125 of the transmitting stage.

In the reception interval, the RF processor 1101 downconverts an RF signal received over the antenna to a baseband analog signal. The ADC 1103 converts the analog signal output from the RF processor 1101 to a digital signal. The OFDM demodulator 1105 converts the time-domain signal output from the ADC 1103 to a frequency-domain signal through Fast Fourier Transform (FFT). The decoder 1107 selects data of subcarriers to actually receive from the frequency-domain data output from the OFDM demodulator 1105, and demodulates and decodes the selected data at the preset modulation level (MCS level).

The message processor 1109 decomposes a control message fed from the decoder 1107 and provides the result to the controller 1111 and the MAC version checker 1113. For example, in case of the terminal, the message processor 1109 decomposes and provides the MAC version TLV value, the supported MAC version TLV value, and the MAC version supported TLV value of the DCD message and the RNG-RSP message received from the base station, to the controller 1111. In case of the base station, the message processor 1109 decomposes and provides the TLV value of the RNG-REQ message to the controller 1111 and the MAC version checker 1113.

The controller 1111 controls the base station or the terminal. According to the result provided from the message processor 1109, when there is no supportable MAC version at all, the controller 1111 notifies the version mismatch or conducts the entry procedure to another base station.

The MAC version checker 1113 receives the MAC version information from the message processor 1109 and determines whether there exists the supportable MAC version.

The ranging controller 1115 executes the ranging procedure according to the result of the MAC version checker 1113.

For example, in the operations of the terminal, the ranging controller 1115 sends the RNG-REQ message including the first supportable MAC version and receives the RNG-RSP message in response to the RNG-REQ. The first supportable MAC version is the highest MAC version supportable by the terminal and the corresponding base station. Alternatively, the ranging controller 1115 sends the RNG-REQ message including second MAC version information of the highest version supported by the terminal and third MAC version information of one or more versions equal to or lower than the second MAC version, and receives the RNG-RSP message in response to the RNG-REQ. When the ranging status of the RNG-RSP message is "success", the ranging controller 1115 maintains the communication by identifying the corresponding MAC version of the base station. When the ranging status of the RNG-RSP message is "abort", the ranging controller 1115 notifies the controller 1111 of the result so that the controller 1111 informs of the version mismatch or performs the entry procedure to another base station when the MAC information supported by the base station mismatches the MAC information supported by the terminal.

In the operations of the base station, after sending the broadcast message, the ranging controller 1115 receives the RNG-REQ message including the information of one or more MAC versions supported by the terminal, and sends the RNG-RSP message by selecting one of the one or more supportable MAC versions. Alternatively, the ranging controller 1115, after sending the broadcast message, receives the RNG-REQ message including the second MAC version information of the highest version supported by the terminal and the third MAC version information of one or more supportable versions equal to or lower than the second MAC version. When detecting one or more supportable MAC versions equal to or lower than the second MAC version, the ranging controller 1115 performs the ranging procedure for the MAC version negotiation. The ranging procedure for the MAC version negotiation sends the RNG-RSP message including the first MAC version information of the highest version supported by the base station and the third MAC version information of one or more supportable versions equal to or lower than the first MAC version.

The message generator 1117 generates a message using the control information provided from the controller 1111. For example, as for the base station, the message generator 1117 constitutes and provides the MAC version TLV value, the supported MAC version TLV value, and the MAC version supported TLV value of the DCD message and the RNG-RSP message to the encoder 1119. As for the terminal, the message generator 1117 constitutes and provides the TLV value of the RNG-REQ message to the encoder, 1119. For instance, the message generator 1117 receives the information relating to the MAC version support from the controller 1111 and constitutes the MAC version related TLV as shown in Table 1 through Table 5.

The encoder 1119 encode sand modulates the signal output from the message generator 1117 at the preset modulation level (the MCS level).

The OFDM modulator 1121 converts the frequency-domain signal output from the encoder 1119 to a time-domain sample signal through Inverse FFT (IFFT). The DAC 1123 converts the sample signal output from the OFDM modulator 1121 to an analog signal. The RF processor 1125 up-converts the baseband signal output from the DAC 1123 to an RF signal and transmits the RF signal over the antenna.

As constructed above, the controller 1111, which is a protocol controller, controls the message processor 1109, the message generator 1117, the MAC version checker 1113, and the ranging controller 1115. Namely, the controller 1111 can function as the message processor 1109, the message generator 1117, the MAC version checker 1113, and the ranging controller 1115. Herein, they are individually provided to distinguish their functions.

As set forth above, when the plurality of the MAC versions is supported in the broadband wireless communication system, the base station and the terminal can match their MAC version by negotiating the version. In the communicable environment, the serious communication rejection can be addressed. The access attempt after the communication rejection caused by the version mismatch can reduce the unnecessary operations such as power consumption of the terminal.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An operating method of a terminal to support a plurality of Media Access Control (MAC) versions in a broadband wireless communication system, the method comprising:
receiving a first message comprising information of a plurality of MAC versions supported by a base station, from the base station; and
in response to receiving the first message, sending information of one or more MAC versions supported by the terminal, to the base station using a second message,
wherein the information of the plurality of MAC versions is constituted as a bitmap corresponding to
a highest supportable MAC version value with a Least Significant Byte (LSB) of the information of the plurality of MAC versions and values for remaining supportable MAC versions of the plurality of MAC versions excluding the highest supportable MAC version with remaining bits of the information of the plurality of MAC versions excluding the LSB.

2. The operating method of claim 1, further comprising:
determining whether the information of the plurality of MAC versions supported by the base station comprises the MAC versions supportable by the terminal; and
when detecting no supportable MAC version, notifying a user of the MAC version mismatch or performing a network entry procedure to another base station.

3. The operating method of claim 1, wherein the sending of the information of the plurality of MAC versions supported by the terminal to the base station using the second message comprises:
transmitting a ranging request message by adding the information of all of the MAC versions supportable by the terminal to the ranging request message; and
transmitting a ranging request message by adding only a highest MAC version of plurality of MAC versions supported by both of the base station and the terminal to the ranging request message.

4. An operating method of a terminal to support a plurality of Media Access Control (MAC) versions in a broadband wireless communication system, the method comprising:
receiving a broadcast message comprising first MAC version information of a highest version among a plurality of MAC versions supported by a base station;
in response to receiving the broadcast message, determining whether the terminal comprises one or more supportable MAC versions among the plurality of MAC versions equal to or lower than the first MAC version;
in response to determining whether the terminal comprises one or more supportable MAC versions, transmitting a second MAC version value of the highest version among the one or more supportable MAC versions equal to or lower than the first MAC version, and information of one or more supportable MAC versions equal to or lower than the second MAC version using a ranging request message; and
receiving a third MAC version value to use, from the base station using a ranging response message,
wherein the second MAC version value and the information of the one or more supportable MAC versions equal to or lower than the second MAC version are contained in the ranging request message as one of: a number of Type-Length-Value (TLV) forms individually; and a single TLV form, and
wherein, when the second MAC version value and the information of the one or more supportable MAC versions equal to or lower than the second MAC version are contained in the ranging request message in the single TLV form, the second MAC version value is represented by a Least Significant Bit (LSB) and the information of the one or more supportable MAC versions equal to or lower than the second MAC version is represented as a bitmap with other bits.

5. The operating method of claim 4, further comprising:
when there is no supportable MAC version equal to or lower than the first MAC version, notifying of the version mismatch or performing a network entry procedure to another base station.

6. The operating method of claim 4, further comprising:
when a ranging status of the ranging response message is "abort", confirming mismatch of MAC information supported by the base station and MAC information supported by the terminal, and notifying a user of the version mismatch or performing a network entry procedure to another base station.

7. An operating method of a base station to support a plurality of Media Access Control (MAC) versions in a broadband wireless communication system, the method comprising:
transmitting a broadcast message, which comprises information of a first plurality of MAC versions supported by the base station, to a corresponding terminal;
in response to transmitting the broadcast message, receiving a message, which comprises information of one or more second MAC versions, among a plurality of MAC versions, supported by the corresponding terminal, from the corresponding terminal; and
selecting a MAC version to be used by comparing the first MAC version information and the second MAC version information, wherein the information of the one or more MAC versions is constituted as a bitmap corresponding to
a highest supportable MAC version value with a Least Significant Byte (LSB) of the information of the plurality of MAC versions and values for remaining supportable MAC versions of the plurality of MAC versions excluding the highest supportable MAC version with remaining bits of the information of the plurality of MAC versions excluding the LSB.

8. The operating method of claim 7, further comprising:
when there is no supportable MAC version, transmitting information of a neighboring base station to the corresponding terminal.

9. An operating method of a base station to support a plurality of Media Access Control (MAC) versions in a broadband wireless communication system, the method comprising:
broadcasting a first MAC version value which is a highest version of a plurality of MAC versions supported by the base station, to a corresponding terminal;
after sending the broadcast message, receiving a ranging request message which comprises a second MAC version value, which is the highest version among the plurality of MAC versions supported by the corresponding terminal, and information of one or more supportable MAC versions lower than the second MAC version; and
determining a MAC version to be used using MAC version information supported by the base station and MAC version information supported by the corresponding terminal, and transmitting the determined MAC version value using a ranging response message,
wherein the first MAC version is higher than or equal to the second MAC version,
wherein the second MAC version value and the information of the one or more supportable MAC versions equal to or lower than the second MAC version are contained in the ranging request message in Type-Length-Value (TLV) forms individually or in a single TLV form, and
when the second MAC version value and the information of the one or more supportable MAC versions equal to or lower than the second MAC version are contained in the ranging request message in the single TLV form, the second MAC version value is represented by a Least Significant Bit (LSB) and the information of the one or more supportable MAC versions equal to or lower than the second MAC version is represented as a bitmap with other bits.

10. The operating method of claim 9, further comprising:
when there is no supportable MAC version equal to or lower than the second MAC version, transmitting information of a neighboring base station to the corresponding terminal.

11. An apparatus of a terminal to support a plurality of Media Access Control (MAC) versions in a broadband wireless communication system, the apparatus comprising:
a receiver configured to receive a broadcast message comprising information of a plurality of MAC versions supported by a base station, from the base station; and
a ranging controller configured to, in response to receiving the broadcast message, send information of one or more MAC versions among the plurality of MAC versions supported by the terminal, to the base station using a message,
wherein the information of the one or more MAC versions is constituted as a bitmap corresponding to
a highest supportable MAC version value with a Least Significant Byte (LSB) of the information of the plurality of MAC versions and values for remaining supportable MAC versions of the plurality of MAC versions excluding the highest supportable MAC version with remaining bits of the information of the plurality of MAC versions excluding the LSB.

12. The apparatus of claim 11, further comprising:
a MAC version checker configured to determine whether the information of the plurality of MAC versions supported by the base station comprises the MAC versions supportable by the terminal; and
a controller configured to, when detecting no supportable MAC version, at least one of: notify a user of the MAC version mismatch; and perform a network entry procedure to another base station.

13. The apparatus of claim 11, wherein the ranging controller is configured to transmit a ranging request message by adding the information of all of the MAC versions supportable by the terminal to the ranging request message, or transmit a ranging request message by adding only a highest MAC version of the plurality of MAC versions supported by both of the base station and the terminal to the ranging request message.

14. An apparatus of a terminal to support a plurality of Media Access Control (MAC) versions in a broadband wireless communication system, the apparatus comprising:
a receiver configured to receive a broadcast message comprising first MAC version information of a highest version among a plurality of MAC versions supported by a base station;
a MAC version checker configured to determine, in response to receiving the broadcast message, whether there are one or more supportable MAC versions equal to or lower than the first MAC version; and
a ranging controller configured to, in response to determining whether there are one or more supportable MAC versions equal to or lower than the first MAC version:
transmit a second MAC version value of the highest version among the one or more supportable MAC versions equal to or lower than the first MAC version, and information of one or more supportable MAC versions equal to or lower than the second MAC version using a ranging request message, and
receive a third MAC version value to use, from the base station using a ranging response message, wherein, when the second MAC version value and the information of the one or more supportable MAC versions equal to or lower than the second MAC version are contained in the ranging request message as the single TLV form, the second MAC version value is represented by a Least Significant Bit (LSB) and the information of the one or more supportable MAC versions equal to or lower than the second MAC version is represented as a bitmap with other bits.

15. The apparatus of claim 14, further comprising:
a controller configured to, when there is no supportable MAC version equal to or lower than the first MAC version, at least one of: notify a user of the version mismatch; and perform a network entry procedure to another base station.

16. The apparatus of claim 14, wherein the second MAC version value and the information of the one or more supportable MAC versions equal to or lower than the second MAC version are contained in the ranging request message in Type-Length-Value (TLV) forms individually or in a single TLV form.

17. The apparatus of claim 16, wherein, when a ranging status of the ranging response message is "abort", the ranging controller is configured to confirm mismatch of the MAC information supported by the base station and the MAC information supported by the terminal, and at least one of: notify a user of the version mismatch; and perform a network entry procedure to another base station.

18. An apparatus of a base station to support a plurality of Media Access Control (MAC) versions in a broadband wireless communication system, the apparatus comprising:
a transmitter configured to transmit a broadcast message comprising information of a first plurality of MAC versions supported by the base station, to a corresponding terminal; and
a controller configured to, in response to transmitting the broadcast message, receive a message comprising information of one or more second MAC versions among a plurality of MAC versions supported by the corresponding terminal, from the corresponding terminal, and select a MAC version to be used by comparing the first MAC version information and the second MAC version information,
wherein the information of the one or more MAC versions is constituted as a bitmap corresponding to
a highest supportable MAC version value with a Least Significant Byte (LSB) of the information of the plurality of MAC versions and values for remaining supportable MAC versions of the plurality of MAC versions excluding the highest supportable MAC version with remaining bits of the information of the plurality of MAC versions excluding the LSB.

19. The apparatus of claim 18, wherein, when there is no supportable MAC version, the controller is configured to transmit information of a neighboring base station to the corresponding terminal.

20. An apparatus of a base station to support a plurality of Media Access Control (MAC) versions in a broadband wireless communication system, the apparatus comprising:
a transmitter configured to transmit a broadcast message comprising a first MAC version value that is a highest version among a plurality of MAC versions supportable; and
a ranging controller configured to, in response to transmitting the broadcast message:
receive a ranging request message comprising a second MAC version value, which is the highest version among the plurality of MAC versions supported by a corresponding terminal, and information of one or more supportable MAC versions lower than the second MAC version,
determine a MAC version to use using MAC version information supported by the base station and MAC version information supported by the corresponding terminal, and
transmit the determined MAC version value using a ranging response message,
wherein the first MAC version is higher than or equal to the second MAC version,
wherein the second MAC version value and the information of the one or more supportable MAC versions equal to or lower than the second MAC version are contained in the ranging request message in Type-Length-Value (TLV) forms individually or in a single TLV form, and
when the second MAC version value and the information of the one or more supportable MAC versions equal to or lower than the second MAC version are contained in the ranging request message in the single TLV form, the second MAC version value is represented by a Least Significant Bit (LSB) and the information of the one or more supportable MAC versions equal to or lower than the second MAC version is represented as a bitmap with other bits.

21. The apparatus of claim 20, further comprising:
a controller configured to, when there is no supportable MAC version equal to or lower than the second MAC version, transmit information of a neighboring base station to the corresponding terminal.

* * * * *